(12) United States Patent  
Belanger et al.

(10) Patent No.: US 8,983,434 B2  
(45) Date of Patent: Mar. 17, 2015

(54) MANAGING OPT-IN AND OPT-OUT FOR PRIVATE DATA ACCESS

(71) Applicant: AT&T Intellectual Property I, L.P., Atlanta, GA (US)

(72) Inventors: David Gerald Belanger, Hillsborough, NJ (US); Divesh Srivastava, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 82 days.

(21) Appl. No.: 13/646,786

(22) Filed: Oct. 8, 2012

(65) Prior Publication Data

US 2014/0099920 A1 Apr. 10, 2014

(51) Int. Cl.
| | |
|---|---|
| H04M 1/66 | (2006.01) |
| H04L 29/06 | (2006.01) |
| H04W 4/02 | (2009.01) |
| H04W 12/02 | (2009.01) |
| H04W 12/08 | (2009.01) |

(52) U.S. Cl.  
CPC ............ *H04W 12/02* (2013.01); *H04L 63/107* (2013.01); *H04W 4/021* (2013.01); *H04W 12/08* (2013.01)  
USPC ........................................................ 455/411

(58) Field of Classification Search  
USPC .............. 726/17, 4; 705/14.64; 455/411, 457, 455/456.2, 414.2, 41.1, 419  
See application file for complete search history.

(56) References Cited

U.S. PATENT DOCUMENTS

| 8,176,176 | B1 | 5/2012 | Chan | |
|---|---|---|---|---|
| 8,713,646 | B2 * | 4/2014 | Stuntebeck | ....................... 726/4 |
| 2007/0224979 | A1 | 9/2007 | O'Neal et al. | |
| 2010/0269156 | A1 * | 10/2010 | Hohlfeld et al. | .................. 726/4 |
| 2012/0005026 | A1 * | 1/2012 | Khan et al. | ................. 705/14.64 |
| 2012/0317638 | A1 * | 12/2012 | Carrara et al. | .................. 726/17 |

* cited by examiner

*Primary Examiner* — Kiet Doan  
(74) *Attorney, Agent, or Firm* — Hartman & Citrin LLC

(57) ABSTRACT

Concepts and technologies disclosed herein are for managing opt-in and opt-out for private data access. According to one aspect disclosed herein, a mobile device can receive a request to obtain private data associated with a user of the mobile device and, in response to the request, determine whether an application program associated with the request is permitted to access the private data based upon a rule. The mobile device, in response to determining that the application program is permitted to access the private data based upon the rule, can instruct the application program to proceed to obtain the private data. The mobile device, in response to determining that the application program is not permitted to access the private data based upon the rule, can instruct the application program to avoid obtaining the private data.

20 Claims, 8 Drawing Sheets

MANAGING OPT-IN AND OPT-OUT FOR PRIVATE DATA ACCESS

TECHNICAL FIELD

The concepts and technologies disclosed herein generally relate to user privacy. More specifically, the concepts and technologies disclosed herein relate to managing opt-in and opt-out for private data access.

BACKGROUND

Some mobile applications require access to a user's private data to provide a personalized user experience. For example, a mobile application may require access to a user's location to provide local search results for restaurants, and another mobile application may require access to a user's social network account information to provide access to functionality of a social network. For many users, the ability to control what private data they share and when they share the private data is paramount to the overall user experience with their mobile device.

Some mobile operating systems provide a global privacy setting through which users can opt-in to or opt-out of allowing certain private data, such as his or her current location, to be utilized by all mobile applications installed on their mobile device. Additional opt-in and opt-out settings are sometimes provided on a per application basis so that the user can opt-in to or opt-out of allowing some applications to access their private data while denying access to others. This cumbersome approach to managing access to private data results in users either opting out and enjoying no benefit from applications that require or are enhanced by the use of private data, or users opting in to and having their private data exposed under all conditions even when this exposure is not desired.

SUMMARY

Concepts and technologies are described herein for managing opt-in and opt-out for private data access. According to one aspect disclosed herein, a method includes receiving a request to obtain private data associated with a user of a mobile device and, in response to the request, determining whether an application program associated with the request is permitted to access the private data based upon a rule. The method also includes instructing the application program to proceed to obtain the private data or to avoid obtaining the private data based upon the determination. In some embodiments, the determination is made by an operating system executing on the mobile device. In some other embodiments, the determination is made by a server computer.

In some embodiments, a rule specifies a condition under which the user has agreed to opt-in to permitting access to the private data. In some other embodiments, a rule specifies a condition under which the user has agreed to opt-out of permitting access to the private data. The condition can be, but is not limited to, a location, a time, a specific application program, and/or a sensor output.

According to another aspect disclosed herein, a method includes generating a response directed to a mobile device. The response can include instructions that are executable by the mobile device to permit the application program to proceed to obtain private data or instructions that are executable by the mobile device to deny the application program to proceed to obtain the private data based upon the determination of whether the application program is permitted to access the private data. The method also includes sending the response to the mobile device. In some embodiments, the method also includes receiving a request to obtain the private data, and in response to the request, determining whether an application program associated with the request is permitted to access the private data based upon a rule.

In some embodiments, the method also includes generating the rule based upon input received from the user. The rule can include a location in which the user has agreed to opt-in to permitting access to the private data, a location in which the user has agreed to opt-out of permitting access to the private data, a specific application program that the user has agreed to opt-in to use of to access the private data, a specific application program that the user has agreed to opt-out of use of to access the private data, a time during which the user has agreed to opt-in to permitting access to the private data, a time during which the user has agreed to opt-out of permitting access to the private data, a sensor output threshold in accordance with which the user has agreed to opt-in to permitting access to the private data, a sensor output threshold in accordance with which the user has agreed to opt-out of permitting access to the private data, a sensor output for which the user has agreed to opt-in to permitting access to the private data, and/or a sensor output for which the user has agreed to opt-out of permitting access to the private data.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
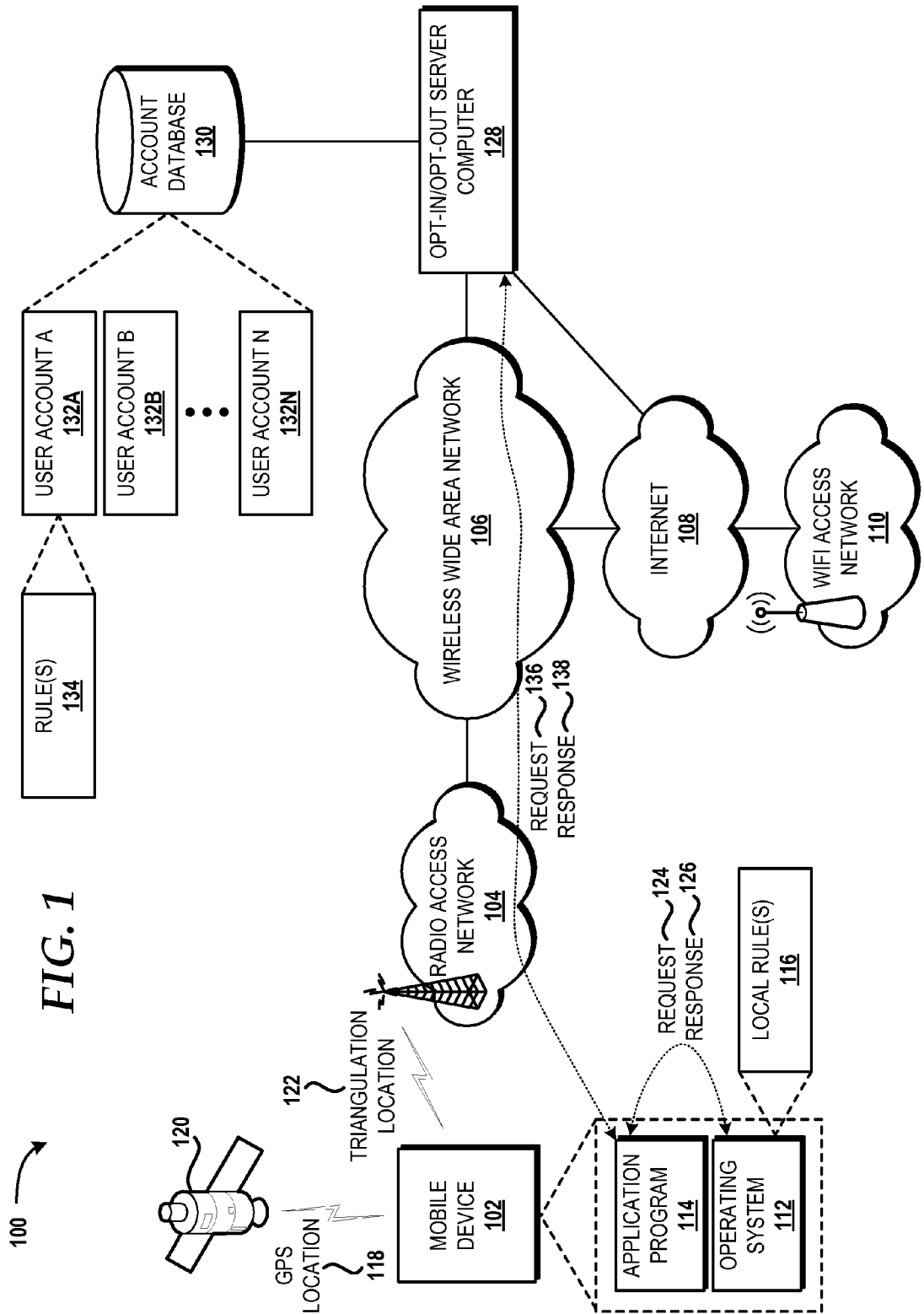
FIG. 1 is a block diagram illustrating aspects of an illustrative operating environment for various concepts disclosed herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, distributed computing systems, microprocessor-based or programmable consumer electronics, minicomputers, mainframe computers, routers, switches, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of managing opt-in and opt-out for private data access will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from illustrative embodiments described herein.

The operating environment 100 shown in FIG. 1 includes a mobile communications device ("mobile device") 102 operating on or in communication with one or more radio access networks ("RANs") 104. The mobile device 102 may be a cellular telephone, a smartphone, a mobile computer, a tablet computer, or other computing device that is configured with an integrated or an external, removable access component that facilitates wireless communication with the RAN 104. In some embodiments, the access component is a cellular telephone that is in wired or wireless communication with a computer to facilitate a tethered data connection to the RAN 104. In some other embodiments, the access component includes a wireless transceiver configured to send data to and receive data from the RAN 104 and a universal serial bus ("USB") or another communication interface for connection to the computer to enable tethering. In any case, the mobile device 102 can wirelessly communicate with the RAN 104 over an air interface in accordance with one or more radio access technologies to send and receive data. The mobile device 102 may also initiate, receive, and/or maintain voice calls with one or more other devices (not shown). The mobile device 102 may also exchange Short Message Service ("SMS") messages, email, and/or other messages to other devices.

In some embodiments, the RAN 104 is a Global System for Mobile communications RAN ("GRAN"), a GSM EDGE RAN ("GERAN"), a Universal Mobile Telecommunications System ("UMTS") Terrestrial Radio Access Network ("UT-RAN"), a Long Term Evolution ("LTE") RAN, any combination thereof, or the like. Moreover, although the mobile device 102 is illustrated as being in communication with a single RAN 104, the mobile device 102 can alternatively or additionally communicate with other RANs, which may utilize the same or different radio access technologies. As such, in some embodiments, the mobile device 102 is a multi-mode communications device.

The illustrated RAN 104 is in communication with a wireless wide area network ("WWAN") 106, which can include a circuit-switched core network ("CS CN"), a packet-switched core network ("PS CN"), and/or an IP multimedia subsystem ("IMS") core network. The WWAN 106 may utilize one or more mobile telecommunications technologies to provide voice and/or data services via the RAN 104 to a WWAN component (not shown) of the mobile device 102. The mobile telecommunications technologies may include, but are not limited to, Global System for Mobile communications ("GSM"), Code Division Multiple Access ("CDMA") ONE, CDMA2000, UMTS, LTE, Worldwide Interoperability for Microwave Access ("WiMAX"), other 802.XX technologies, and/or the like. Moreover, the RAN 104 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and/or the like to provide access to the WWAN 106. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access standards. The WWAN 106 may be configured to provide voice and/or data communications with any combination of the above technologies. The WWAN 106 may be configured to or adapted to provide voice and/or data communications in accordance with future generation technologies.

The illustrated WWAN 106 is in communication with an internet 108, such as the Internet. The mobile device 102 can access the internet 108 via the RAN 104 and the WWAN 106, as in the illustrated embodiment. The mobile device 102 can additionally or alternatively access the internet 108 via a WI-FI access network 110. The WI-FI access network 110 operates in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WI-FI access network 110 is implemented utilizing one or more wireless WI-FI access points. In some implementations, one or more of the wireless WI-FI access points is another mobile device or other computing device that functions as a WI-FI hotspot. In some implementations, the mobile device 102 connects to the WI-FI access network 110 via one or more secure connections, each of which may utilize an encryption technology such as, but not limited to, WI-FI Protected Access ("WPA"), WPA2, Wired Equivalent Privacy ("WEP"), or the like.

The illustrated mobile device 102 is configured to execute an operating system 112 and an application program 114. The operating system 112 is a program for controlling the operation of the mobile device 102. According to various embodiments, the operating system 112 may be SYMBIAN OS from SYMBIAN LIMITED, WINDOWS mobile OS from Microsoft Corporation of Redmond, Wash., WINDOWS phone OS from Microsoft Corporation, PALM WEBOS from Hewlett-Packard Company of Palo Alto, Calif., BLACK-BERRY OS from Research In Motion Limited of Waterloo, Ontario, Canada, IOS from Apple Inc. of Cupertino, Calif., or ANDROID OS from Google Inc. of Mountain View, Calif. Although a single operating system 112 is shown, multiple operating systems are contemplated. Other operating systems are contemplated.

The application program 114 executes on top of the operating system 112. When executed by the mobile device 102, the application program 114 provides functionality to the mobile device 102 including one or more functions that require or are enhanced by access to private data associated with a user of the mobile device 102. The private data can include data identified as being private by the operating system 112, the application program 114, the user, another party, another entity, or another application. The private data can include data such as, but not limited to, location, name, physical address, email address, telephone number, user name, password, security question answer, contact list, social security number, user profile, social networking data, and/or the like.

In the illustrated embodiment, the operating system 112 includes one or more local rules 116 (hereinafter, at times, referred to collectively or generically as "local rules 116"). In some embodiments, the local rules 116 include a rule having at least one condition under which a user has agreed to opt-in to permitting the application program 114 access to the private data. In some other embodiments, the local rules 116 include a rule having at least one condition under which a user has agreed to opt-out of permitting the application program 114 access to the private data. It is contemplated that multiple rules may be used to specify at least one condition under which a user has agreed to opt-in to permitting the application program 114 access to the private data and at least one condition under which a user has agreed to opt-out of permitting the application program 114 access to the private data. It is further contemplated that a single rule may be used to specify at least one condition under which a user has agreed to opt-in to permitting the application program 114 access to the private data and at least one condition under which a user has agreed to opt-out of permitting the application program 114 access to the private data.

In some embodiments, the local rules 116 are alternatively included in a device software package that is installed on the mobile device 102 prior to shipment to the end user. The device software package can include the operating system 112 and the local rules 116. The device software package can alternatively include the operating system 112, one or more application programs, and the local rules 116. The device software package can be installed by the device manufacturer or by the wireless carrier to which the mobile device 102 is locked. In some embodiments, the device manufacturer installs the operating system 112 prior to shipment of the mobile device 102 to the wireless carrier, who then installs the remaining components of the device software package, such as the local rules 116, prior to shipment of the mobile device 102 to the end user.

The local rules 116 can include a pre-defined rule that ships with the operating system 112 pre-installed on the mobile device 102. The local rules 116 can alternatively or additionally include a user-defined rule that is defined by a user of the mobile device 102 through a function of the operating system 112 via one or more menus, such as via a settings menu of the operating system 112. A rule generation program is also contemplated for facilitating the generation of user-defined rules. The rule generation program can be installed on the mobile device 102 or made available via a web application accessible via the internet 108. Additional details regarding rule generation are described herein below with reference to FIG. 6.

In some embodiments, a condition under which the user has agreed to opt-in to or opt-out of permitting the application program 114 access to private data includes a location at which or a location within a specified distance of which the user has agreed to opt-in to permitting the application program 114 to receive the private data, or a location at which or a location within a specified distance of which the user has agreed to opt-out of permitting the application program 114 to receive the private data. In some embodiments, a location includes a Global Positioning System ("GPS") location 118 obtained by the mobile device 102 via a GPS sensor (not shown) of the mobile device 102 from a GPS satellite 120. In some other embodiments, a location includes a triangulation location 122 obtained by the mobile device 102 via a transceiver (not shown) of the mobile device 102 from multiple base stations of the RAN 104 and/or another RAN. Other triangulation techniques such as WI-FI triangulation of multiple WI-FI networks, including, for example, the WI-FI access network 110, are also contemplated. A location, in some other embodiments, includes a physical address, a cell site ID, or a network ID such as a Service Set Identification ("SSID"). Other location information such as location coordinates obtained from a location beacon, microcell, femtocell, or location broadcasting device is also contemplated.

In some embodiments, a condition under which the user has agreed to opt-in to or opt-out of permitting the application program 114 access to private data includes a specific application program. Under such a condition, the application program 114 is permitted or not permitted to access the private data when the specific application program is also being used. The phrase "being used" is intended to encompass instances in which at least a portion of the operations executed by the mobile device 102 are associated with the specific application program, even if the specific application program is in a suspended state or otherwise non-active state, which is also known as a background state, dormant state, or tombstone state.

In some embodiments, a condition under which the user has agreed to opt-in to or opt-out of permitting the application program 114 access to the private data includes a time. The time can be a specific time such as 12:00 PM. Alternatively, the time can be a time period such as from 12:00 PM to 2:30 PM. The time can be in 12-hour or 24-hour format. The time can additionally identify a date in terms of day of the week, calendar day, calendar month, and/or calendar year.

In some embodiments, a condition under which the user has agreed to opt-in to or opt-out of permitting the application program 114 access to private data includes an output of a sensor of the mobile device 102. A discrete output value can be utilized as part of the condition. For example, the condition can specify if the discrete output value of the sensor is X, then the condition is met; otherwise, the condition is not met. An output threshold of the sensor alternatively can be used. For example, the condition can specify an upper and/or lower threshold value for the sensor.

The sensor can include, but is not limited to, a magnetometer, an ambient light sensor, a proximity sensor, an accelerometer, a gyroscope, a GPS sensor, a temperature sensor, or a shock detection sensor. Although not shown in the illustrated embodiment, the mobile device 102 can include one or more of sensors, the output of which may be used as a condition of one or more of the local rules 116.

As used herein, a sensor output can also include output from other components of the mobile device 102 that may not be considered sensors in a traditional sense, but that provide data that can be used as a condition for one or more of the local rules 116. For example, a transceiver can have an output for signal strength that is visually conveyed to a user of the mobile device 102 as one or more bars. This output can be used as the basis for a condition such that if three or more bars are present, for example, then opt-in, and if fewer than three bars are present then opt-out.

A magnetometer is configured to measure the strength and direction of a magnetic field. A magnetometer can provide measurements to a compass application program stored within a memory of the mobile device 102 in order to provide a user with accurate directions in a frame of reference including the cardinal directions of north, south, east, and west. Similar measurements can be provided to a navigation application program that includes a compass component. The measurements obtained by a magnetometer can be used as a condition under which the user has agreed to opt-in to or opt-out of permitting the application program 114 access to the private data.

An ambient light sensor is configured to measure ambient light. An ambient light sensor can provide measurements to the operating system 112, for example, to automatically adjust the brightness of a display of the mobile device 102 to compensate for low-light and high-light environments. The measurements obtained by an ambient light sensor can be used as a condition under which the user has agreed to opt-in to or opt-out of permitting the application program 114 access to the private data.

A proximity sensor is configured to detect the presence of an object or thing in proximity to the mobile device 102. For example, a proximity sensor can detect the presence of a user's body, and utilize the proximity information as a condition under which the user has agreed to opt-in to or opt-out of permitting the application program 114 access to the private data.

An accelerometer is configured to measure proper acceleration. Output from the accelerometer can be used as a condition under which the user has agreed to opt-in to or opt-out of permitting the application program 114 access to the private data.

A gyroscope is configured to measure and maintain orientation. Output from the gyroscope can be used as a condition under which the user has agreed to opt-in to or opt-out of permitting the application program 114 access to the private data.

A GPS sensor is configured to receive signals from GPS satellites, such as the GPS satellite 120, for use in calculating a location. The location calculated by a GPS sensor can be used as a condition under which the user has agreed to opt-in to or opt-out of permitting the application program 114 access to the private data. The GPS sensor can also be used in Assisted GPS ("A-GPS") implementations.

Although sensor output has been described herein above, any output of the mobile device 102 and/or input received by the mobile device 102 can be used as a condition under which the user has agreed to opt-in to or opt-out of permitting the application program 114 access to the private data. For example, the mobile device 102 receiving data from the WWAN 106 can be a condition under which the user has agreed to opt-out of permitting the application program 114 access to the private data. As another example, the mobile device 102 receiving data only from a WI-FI network, such as the WI-FI access network 110, can be a condition under which the user has agreed to opt-in to permitting the application program 114 access to the private data.

In the illustrated embodiment, the application program 114 is configured to generate a local request 124 and to send the local request 124 to the operating system 112. The operating system 112 can receive the local request 124 and determine whether the application program 114 is permitted to access private data based upon the local rules 116. The operating system 112 can then generate a local response 126 to the local request 124. The local response 126 includes instructions for the application program 114 to either proceed to obtain the private data or to avoid obtaining the private data based upon the determination that the application program 114 is permitted to access the private data based upon the local rules 116 or the determination that the application program 114 is not permitted to access the private data based upon the local rules 116, respectively.

The operating environment 100 also includes an opt-in/opt-out server computer 128 that is illustrated as being in communication with the WWAN 106 and the internet 108. The opt-in/opt-out server computer 128 can be provided for implementations in which opt-in and opt-out rules are not managed locally on the mobile device 102 or in addition to opt-in and opt-out rules being managed locally on the mobile device 102.

The opt-in/opt-out server computer 128 is illustrated as being in communication with an account database 130 that includes one or more user accounts. A user account can be a wireless carrier service account, such as a voice and/or data service account. Alternatively, a user account can be linked to a wireless carrier service account. A user account can be associated with a third party service made available to users for managing their opt-in and opt-out rules.

In the illustrated example, the account database 130 includes a user account A 132A, a user account B 132B, and a user account N 132N, one or more of which can be associated with a user of the mobile device 102. The user account A 132A is shown as including one or more rules 134 (hereinafter, at times, referred to collectively or generically as "rules 134"). The rules 134 can be configured in the same manner described herein above regarding various conditions under which rules are to be applied to opt-in to or opt-out of access to a user's private data. It is contemplated that the local rules 116 and/or the rules 134 can be applied to opt-in to or opt-out of access to a user's private data. The application of the local rules 116 or the rules 134 can be controlled by the user, the application program 114, the operating system 112, a wireless carrier, another application program, and/or a third party.

In lieu of the application program 114 sending the local request 124 to the operating system 112 to obtain private data associated with a user of the mobile device 102, in some embodiments, the application program 114 generates and sends a remote request 136 to the opt-in/opt-out server computer 128. The opt-in/opt-out server computer 128 then determines, in response to the remote request 136, whether the application program 114 is permitted to access the private data based upon the rules 134. The opt-in/opt-out server computer 128 then generates a remote response 138 to the remote request 136. The remote response 138 can include instructions for the application program 114 to either proceed to obtain the private data or to avoid obtaining the private data based upon the determination that the application program 114 is permitted to access the private data based upon the rules 134 or based upon the determination that the application program 114 is not permitted to access the private data based upon the rules 134, respectively. In some other embodiments, the operating system 112 receives the remote request 136 from the application program 114 and forwards the remote request 136 to the opt-in/opt-out server computer 128.

In some embodiments, the application program 114 includes an opt-in/opt-out function to allow/deny the application program 114 access to private data. If the opt-out option is enabled, the application program 114 will not attempt to access the private data. If the opt-in option is enabled, however, the application program 114 will attempt to access the private data. This attempt can include the local request 124 or the remote request 136. Alternatively, the attempt includes a request to obtain private data directed to one or more components of the mobile device 102, such as a GPS sensor, a transceiver, another application program, or another sensor. In these embodiments, the operating system 112 can intercept the request to the one or more components and determine whether the application program 114 is permitted to access the private data based upon the local rules 116. In this manner, opt-in/opt-out functionality can be provided at the operating system level for all application programs regardless of the particular opt-in/opt-out settings enabled for each of the application programs. The operating system 112 can alternatively intercept the local request 124, generate the remote request 136 based upon the local request 124, and send the remote request 136 to the opt-in/opt-out server computer 128 to receive instructions regarding permitting or denying the application program 114 access to the private data.

It should be understood that some implementations of the operating environment 100 include multiple mobile devices 102, multiple RANs 104, multiple WANs 106, multiple internets 108, multiple WI-FI access networks 110, multiple operating systems 112, multiple application programs 114, multiple GPS satellites 120, multiple opt-in/opt-out server computers 128, and/or multiple account databases 130. Thus, the illustrated embodiment should be understood as being illustrative, and should not be construed as being limiting.

Figure 2:
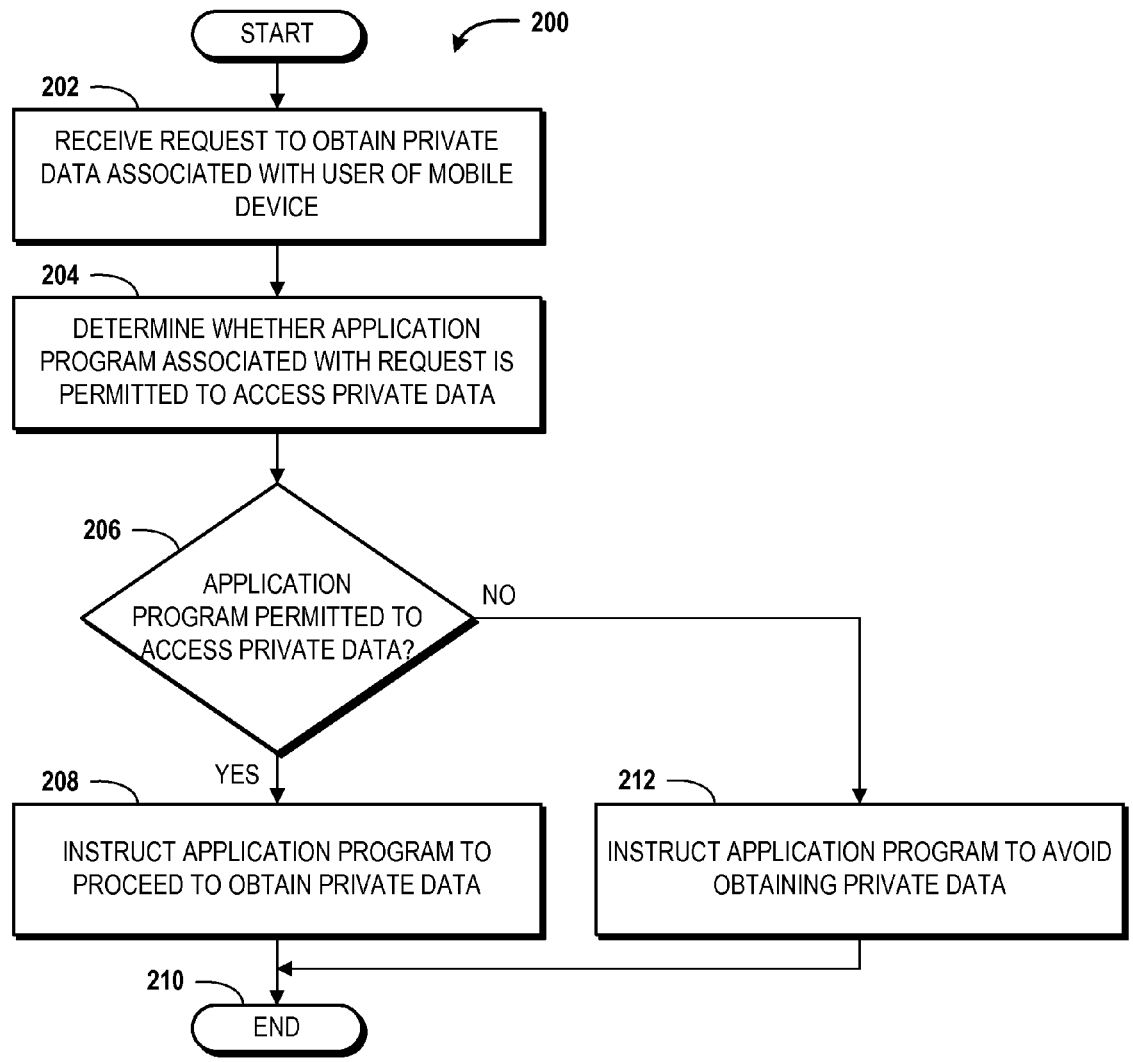
FIG. 2 is a flow diagram illustrating aspects of a method for managing access to private data on a mobile device, according to an illustrative embodiment.

Turning now to FIG. 2, a flow diagram illustrating aspects of a method 200 for managing access to private data on a mobile device will be described, according to an illustrative embodiment. It should be understood that the operations of the illustrative methods disclosed herein are not necessarily presented in any particular order and that performance of some or all of the operations in an alternative order(s) is possible and is contemplated. The operations have been presented in the demonstrated order for ease of description and illustration. Operations may be combined, separated, added, omitted, modified, and/or performed simultaneously or in another order without departing from the scope of the subject disclosure.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multiprocessor systems, distributed computing systems, minicomputers, mainframe computers, personal computers, hand-held computing devices, microprocessor-based, programmable consumer electronics, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. As used herein, "cause a processor to perform operations" includes causing a processor of a computing system, such as the mobile device 102 or the opt-in/opt-out server computer 128, to perform one or more operations of the operations and/or causing the processor to direct other components of the computing system to perform one or more of the operations.

The method 200 is described as being performed by the mobile device 102 (shown in FIG. 1). In some embodiments, one or more of the operations of the method 200 are performed by the operating system 112 executing on the mobile device 102. In some other embodiments, one or more of the operations of the method 200 are performed by other instructions executed by the mobile device 102 that are not included in the operating system 112, but are instead included as part of a device software package that includes the operating system 112. As such, the operating system 112 as used in the method 200 is intended to encompass a stand-alone mobile device operating system, such as any of such operating systems described herein above, and a mobile device operating system and additional instructions provided as part of a device software package. These instructions may execute at the operating system level or on top of the operating system level. In any case, the method 200 can be performed by the mobile device 102 utilizing the local rules 116 without communicating with the opt-in/opt-out server computer 128. In some embodiments, however, the opt-in/opt-out server computer 128 populates one or more of the local rules 116 via a push operation directed to the mobile device 102. The push operation may be triggered by a rule change, for example. Other triggers in response to which the opt-in/opt-out server computer 128 pushes information to the mobile device 102 are contemplated.

The method 200 begins and proceeds to operation 202, wherein the operating system 112 receives a request, such as the local request 124, to obtain private data associated with a user of the mobile device 102. In some embodiments, the local request 124 is generated by an application program, such as the application program 114, and is directed to a component of the mobile device 102 that is configured to obtain the private data. For example, the local request 124 may be directed to a GPS sensor of the mobile device 102 to instruct the GPS sensor to obtain the GPS location 118. In these embodiments, the operating system 112 can intercept the local request 124 prior to the local request 124 reaching the GPS sensor. As such, the application program 114 does not need to be updated or otherwise reconfigured. In some other embodiments, the application program 114 is configured to generate the local request 124 and send the local request 124 directly to the operating system 112.

From operation 202, the method 200 proceeds to operation 204, wherein the operating system 112 determines whether the application program 114 is permitted to access the private data. The determination at operation 204 is based upon one or more of the local rules 116. If, at operation 206, the application program 114 is permitted to access the private data based upon the determination made at operation 204, the method 200 proceeds to operation 208, wherein the operating system 112 instructs the application program 114 to proceed to obtain the private data identified in the request. From operation 208, the method 200 proceeds to operation 210, wherein the method 200 may end. If, at operation 206, the application program 114 is not permitted to access the private data based upon the determination made at operation 204, the method 200 proceeds to operation 212, wherein the operating system 112 instructs the application program 114 to avoid obtaining the private data identified in the request. From operation 212, the method 200 proceeds to operation 210, wherein the method 200 may end.

Figure 3:
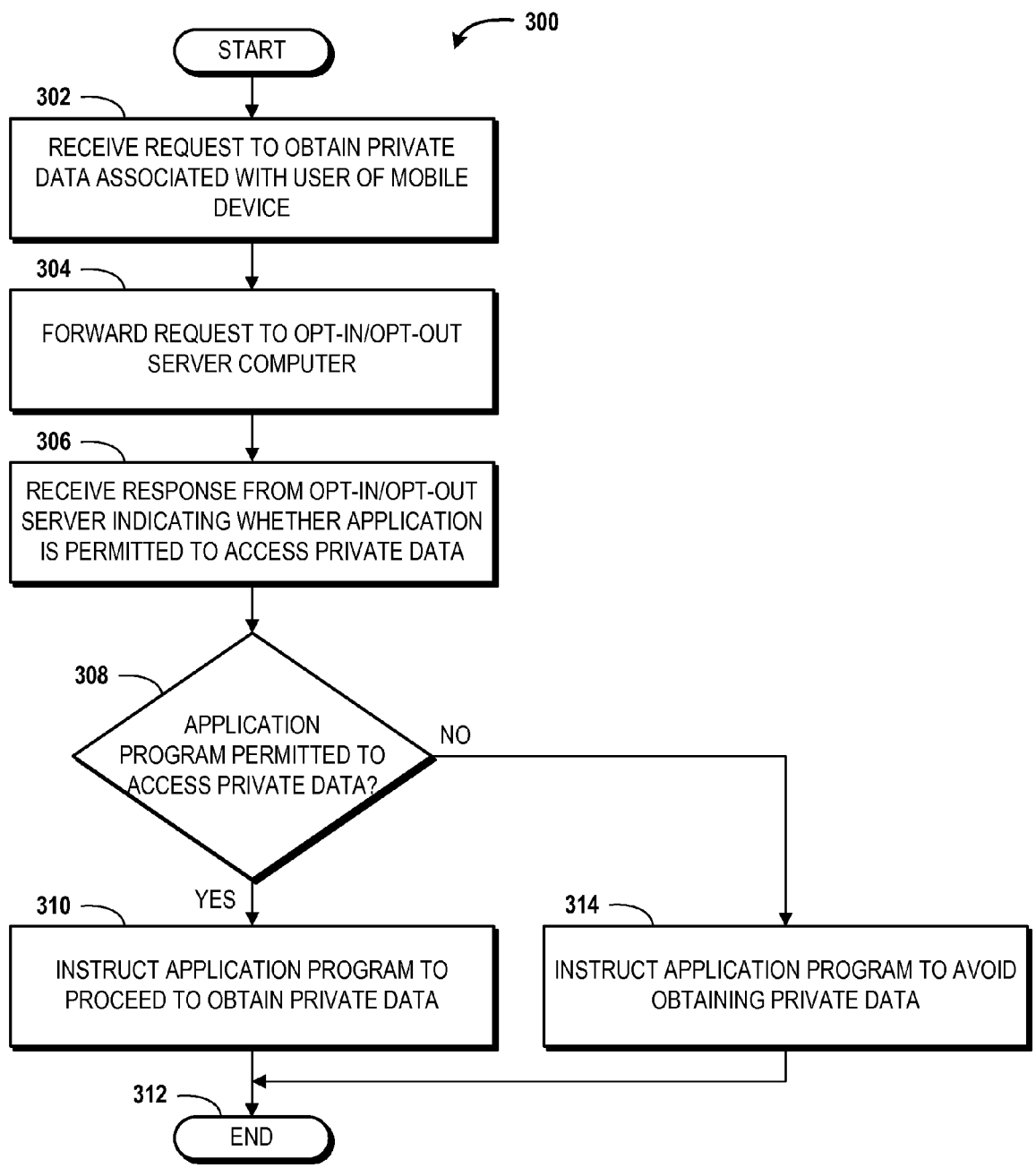
FIG. 3 is a flow diagram illustrating aspects of another method for managing access to private data on a mobile device, according to an illustrative embodiment.

Turning now to FIG. 3, a flow diagram illustrating aspects of a method 300 for managing access to private data on a mobile device will be described, according to an illustrative embodiment. The method 300 is described as being performed by the mobile device 102 (shown in FIG. 1). In some embodiments, one or more of the operations of the method 300 are performed by the operating system 112 executing on the mobile device 102. In some other embodiments, one or more of the operations of the method 300 are performed by other instructions executed by the mobile device 102 that are not included in the operating system 112, but are instead included as part of a device software package that includes the operating system 112. As such, the operating system 112 as used in the method 300 is intended to encompass a standalone mobile device operating system, such as any of such operating systems described herein above, and a mobile device operating system and additional instructions provided as part of a device software package. These instructions may execute at the operating system level or on top of the operating system level. In any case, the method 300 can be performed by the mobile device 102 utilizing the rules 134 received from the opt-in/opt-out server computer 128.

The method 300 begins and proceeds to operation 302, wherein the operating system 112 receives a request, such as the remote request 136, to obtain private data associated with a user of the mobile device 102. In some embodiments, the remote request 136 is generated by an application program, such as the application program 114, and is directed to a component of the mobile device 102 that is configured to obtain the private data. For example, the remote request 136 may be directed to a GPS sensor of the mobile device 102 to instruct the GPS sensor to obtain the GPS location 118. In these embodiments, the operating system 112 can intercept the remote request 136 prior to the remote request 136 reaching the GPS sensor. In some other embodiments, the application program 114 is configured to generate the remote request 136 and direct the remote request 136 to the operating system 112.

From operation 302, the method 300 proceeds to operation 304, wherein the mobile device 102 forwards the remote request 136 to the opt-in/opt-out server computer 128. From operation 304, the method 300 proceeds to operation 306, wherein the mobile device 102 receives a response to the request, such as the remote response 138, from the opt-in/opt-out server computer 128 indicating whether the application program 114 is permitted to access the private data.

From operation 306, the method 300 proceeds to operation 308, wherein the operating system 112 determines if the application program 114 is permitted to access the private data based upon the indication received at operation 306. If the indication received at operation 306 indicates that the application program 114 is permitted to access the private data, the method 300 proceeds to operation 310, wherein the operating system 112 instructs the application program 114 to proceed to obtain the private data identified in the remote request 136. From operation 310, the method 300 proceeds to operation 312, wherein the method 300 may end. If the indication received at operation 306 indicates that the application program 114 is not permitted to access the private data, the method 300 proceeds to operation 314, wherein the operating system 112 instructs the application program 114 to avoid obtaining the private data identified in the remote request 136. From operation 314, the method 300 proceeds to operation 312, wherein the method 300 may end.

The method 300 is described as a pull configuration between the mobile device 102 and the opt-in/opt-out server computer 128. It should be understood, however, that some implementations of the opt-in/opt-out server computer 128 could proactively populate the mobile device 102 whenever a rule change occurs, thus enabling the mobile device 102 to determine whether or not to allow the application program 114 access to the private data without having to contact the opt-in/opt-out server computer 128. In other words, the mobile device 102 and the opt-in/opt-out server computer 128, in some embodiments, are implemented in a push configuration, wherein the opt-in/opt-out server computer 128 pushes information to the mobile device 102 instead of the mobile device 102 having to request the information.

Figure 4:
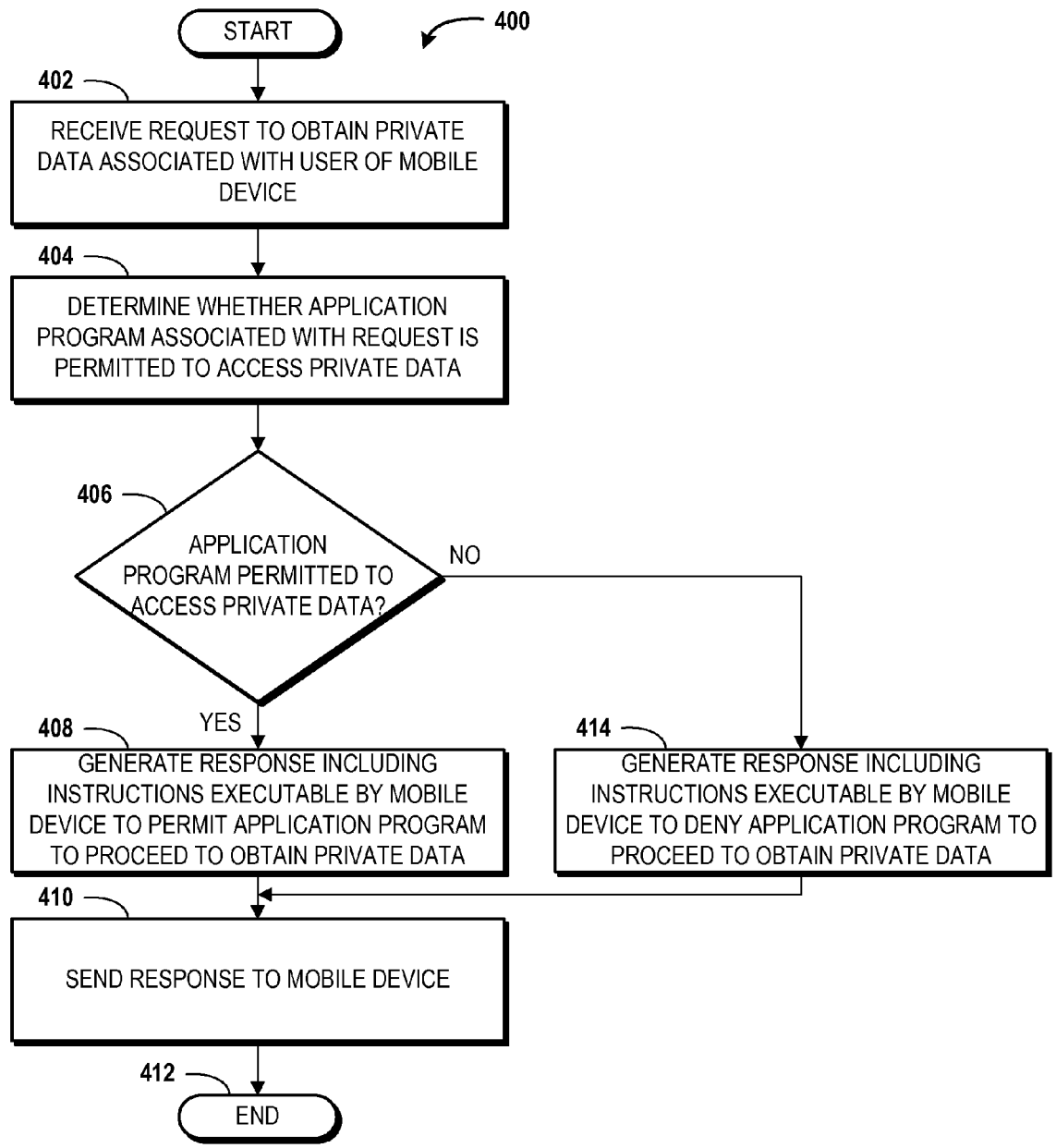
FIG. 4 is a flow diagram illustrating aspects of a method for instructing a mobile device to permit or deny an application program access to private data, according to an illustrative embodiment.

Turning now to FIG. 4, a flow diagram illustrating aspects of a method 400 for instructing a mobile device to permit or deny an application program access to private data will be described, according to an illustrative embodiment. The method 400 is described as being performed by the opt-in/opt-out server computer 128. The opt-in/opt-out server computer 128 can be owned and/or operated by a wireless carrier, by a manufacturer of the mobile device 102, or by another party.

The method 400 begins and proceeds to operation 402, wherein the opt-in/opt-out server computer 128 receives a request, such as the remote request 136, to obtain private data associated with a user of the mobile device 102. From operation 402, the method 400 proceeds to operation 404, wherein the opt-in/opt-out server computer 128 determines whether an application program, such as the application program 114, associated with the request is permitted to access the private data. The determination at operation 404 is based upon one or more of the rules 134.

If, at operation 406, the application program 114 is permitted to access the private data based upon the determination made at operation 404, the method 400 proceeds to operation 408, wherein the opt-in/opt-out server computer 128 generates a response, such as the remote response 138, including instructions that are executable by the mobile device 102 to permit the application program 114 to proceed to obtain the private data identified in the request. From operation 408, the method 400 proceeds to operation 410, wherein the opt-in/opt-out server computer 128 sends the remote response 138 to the mobile device 102. From operation 410, the method 400 proceeds to operation 412, wherein the method 400 may end.

If, at operation 406, the application program 114 is not permitted to access the private data based upon the determination made at operation 404, the method 400 proceeds to operation 414, wherein the opt-in/opt-out server computer 128 generates a response, such as the remote response 138, including instructions that are executable by the mobile device 102 to deny the application program 114 to proceed to obtain the private data identified in the request. From operation 414, the method 400 proceeds to operation 410, wherein the opt-in/opt-out server computer 128 sends the remote response 138 to the mobile device 102. From operation 410, the method 400 proceeds to operation 412, wherein the method 400 may end.

Figure 5:
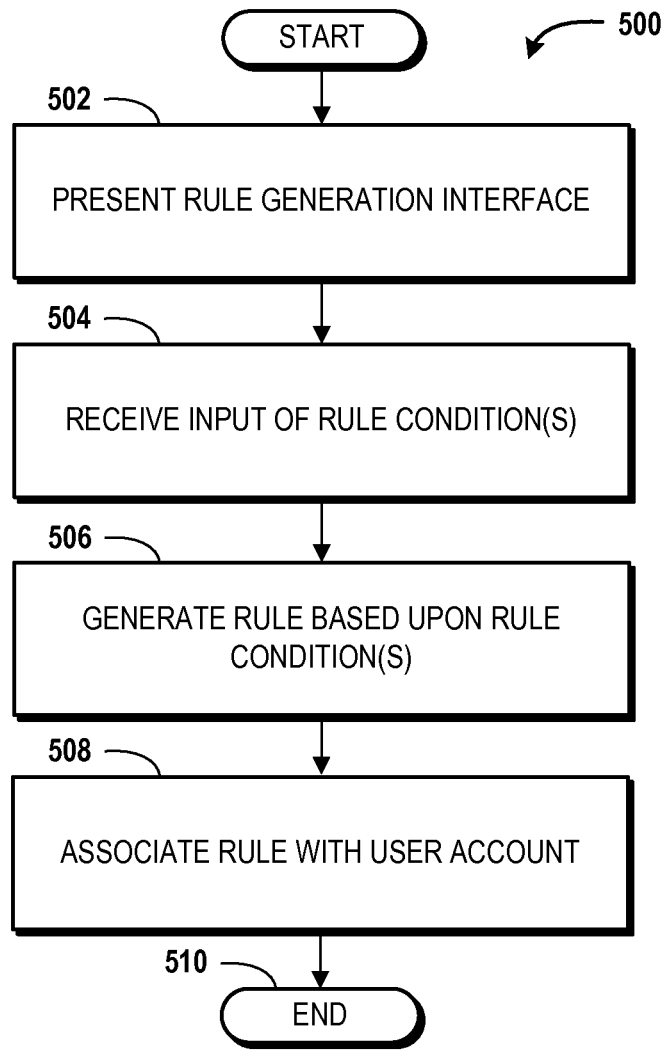
FIG. 5 is a flow diagram illustrating aspects of a method for creating an opt-in rule or an opt-out rule, according to an illustrative embodiment.

Turning now to FIG. 5, a flow diagram illustrating aspects of a method 500 for creating an opt-in rule or an opt-out rule, according to an illustrative embodiment. The method 500 is described as being performed by the mobile device 102. In some embodiments, the mobile device 102 executes the operating system 112 to perform the operations of the method 500. In some other embodiments, the mobile device 102 executes a web browser to access a user's account via a uniform resource locator ("URL") associated with a web page or web application provided by or for the opt-in/opt-out server computer 128 to perform the operations of the method 500. In some other embodiments, the mobile device 102 executes a native application program including instructions that, when executed by the mobile device 102, cause the mobile device 102 to perform the operations of the method 500.

The method 500 begins and proceeds to operation 502, wherein the mobile device 102 presents a rule generation interface. From operation 502, the method 500 proceeds to operation 504, wherein the mobile device 102 receives an input of one or more rule conditions, such as any of the conditions described in greater detail above. At operation 506, a rule based upon the condition(s) received at operation 504 is generated. In embodiments in which the user has accessed a web page to utilize the rule generation interface, rule generation can be performed by or for the opt-in/opt-out server computer 128. In embodiments in which the user has accessed an operating system setting or a native application program to utilize the rule generation interface, the rule generation can be performed by the mobile device 102. It should be understood, however, that operation 506 may be performed at the mobile device 102, at the opt-in/opt-out server computer 128, or at some other computing system regardless of the source of the rule generation interface.

From operation 506, the method 500 proceeds to operation 508, wherein the rule generated at operation 506 is associated with a user account. The user account, in some embodiments, is a local user account stored on the mobile device 102 to provide personalized settings to one or more users. The local user account can include one or more settings regarding functions of the mobile device 102 such as operating system and/or application settings, including settings particular to opt-in/opt-out functionality. In some other embodiments, the user account is a remote user account, such as one of the user accounts 132 stored in the account database 130. From operation 508, the method 500 proceeds to operation 510, wherein the method may end.

Figure 6:
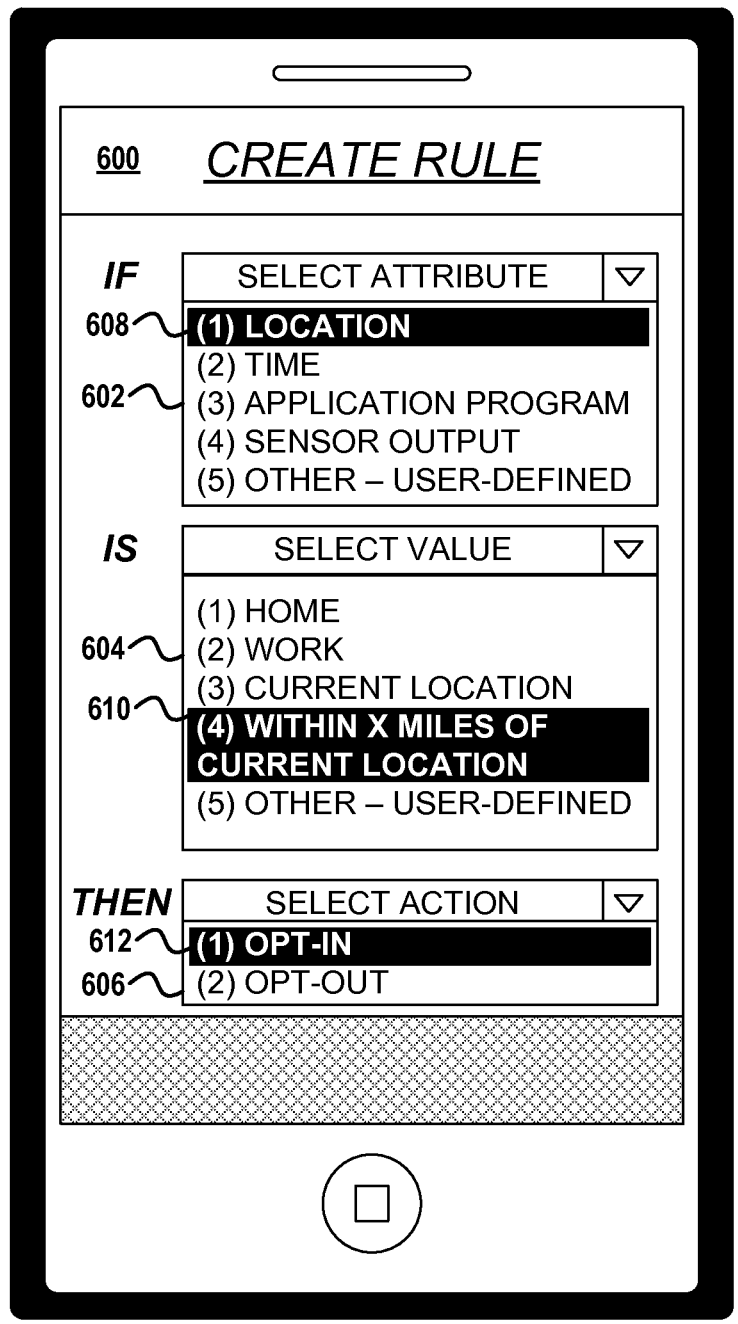
FIG. 6 is a user interface diagram illustrating an illustrative rule creation interface through which a user can create an opt-in rule or an opt-out rule, according to an illustrative embodiment.

Turning now to FIG. 6, a user interface diagram illustrating an illustrative rule generation interface 600 through which a user can generate an opt-in rule and/or an opt-out rule will be described, according to an illustrative embodiment. The illustrated rule generation interface 600 includes an If Attribute selection menu 602, an Is Value selection menu 604, and a Then Action selection menu 606 through which a user can specify a condition under which a rule is to be applied. Although the illustrated rule generation interface 600 shows various menus for the creation of a single rule, the rule generation interface 600 can be configured to facilitate the creation of multiple rules. The aforementioned menus of the rule generation interface 600 are now described in greater detail.

The If Attribute selection menu 602 enables selection of an if attribute for a condition under which a rule is to be applied. The illustrated If Attribute selection menu 602 shows a plurality of if attributes, including a location attribute 608, a time attribute, an application program attribute, a sensor output attribute, and an other—user-defined attribute. In the illustrated example, the If Attribute selection menu 602 shows the location attribute 608 in a selected state. The location attribute 608 enables a user to specify a geographical location at which or within which to apply the rule. The time attribute enables a user to specify a time at which or a time period within which to apply the rule. The application program attribute enables a user to specify an application program that is being used to which to apply the rule. The sensor output attribute enables a user to specify a sensor output value at which to apply the rule or a sensor output threshold in accordance with which to apply the rule. The other—user-defined attribute enables a user to define a condition under which to apply the rule.

The Is Value selection menu 604 enables selection of an is value for a condition under which the rule is to be applied. The illustrated Is Value selection menu 604 shows a plurality of is values that are available given the selection of the location attribute 608 from the If Attribute selection menu 602. The illustrated plurality of is values includes a home value, a work value, a current location value, a within X miles of current location value 610, and an other—user-defined value. It should be understood, however, that the is values shown in the Is Value selection menu 604 can alternatively include one or more is values related to any of the other if attributes, when selected in lieu of the location attribute 608.

In the illustrated example, the Is Value selection menu 604 shows the within X miles of current location value 610 in a selected state. The within X miles of current location value 610 enables a user to specify a geographical area of within X miles of a current location within which the rule is to be applied. After selection of the within X miles of current location value 610, an additional menu item or prompt can be shown to request user input of X. This is not shown in FIG. 6 merely for ease of illustration.

The home value enables a user to specify a home location at which to apply the rule. The home location can be a pre-defined geographical location identified by the user as being associated with the user's home. For example, the mobile device 102 can obtain location information via GPS, cellular triangulation, and/or WI-FI triangulation, and the user can specify this location information as being associated with the geographical location of the user's home. Similarly, the work location can be a pre-defined location identified by the user as being associated with the geographical location of the user's work. The current location value enables a user to specify a current location at which to apply the rule. When the current location value is selected, the mobile device 102 can obtain location information via GPS, cellular triangulation, and/or WI-FI triangulation, and utilize this location information as the geographical location at which to apply the rule. The other—user-defined value enables a user to define a geographical location at which or within which to apply the rule.

The Then Action selection menu 606 enables selection of a then action to establish the rule as being either an opt-in rule or an opt-out rule. The illustrated Then Action selection menu 606 includes an opt-in option 612 in a selected state and an opt-out option. The opt-in option 612 enables a user to specify that the if attribute selected through the If Attribute selection menu 602 and the is value selected through the Is Value selection menu 604 dictate a condition under which private data can be accessed by an application program to which the rule is applied. The opt-out option enables a user to specify that the if attribute selected through the If Attribute selection menu 602 and the is value selected through the Is Value selection menu 604 dictate a condition under which private data cannot be accessed by an application program to which the rule is applied.

Figure 7:
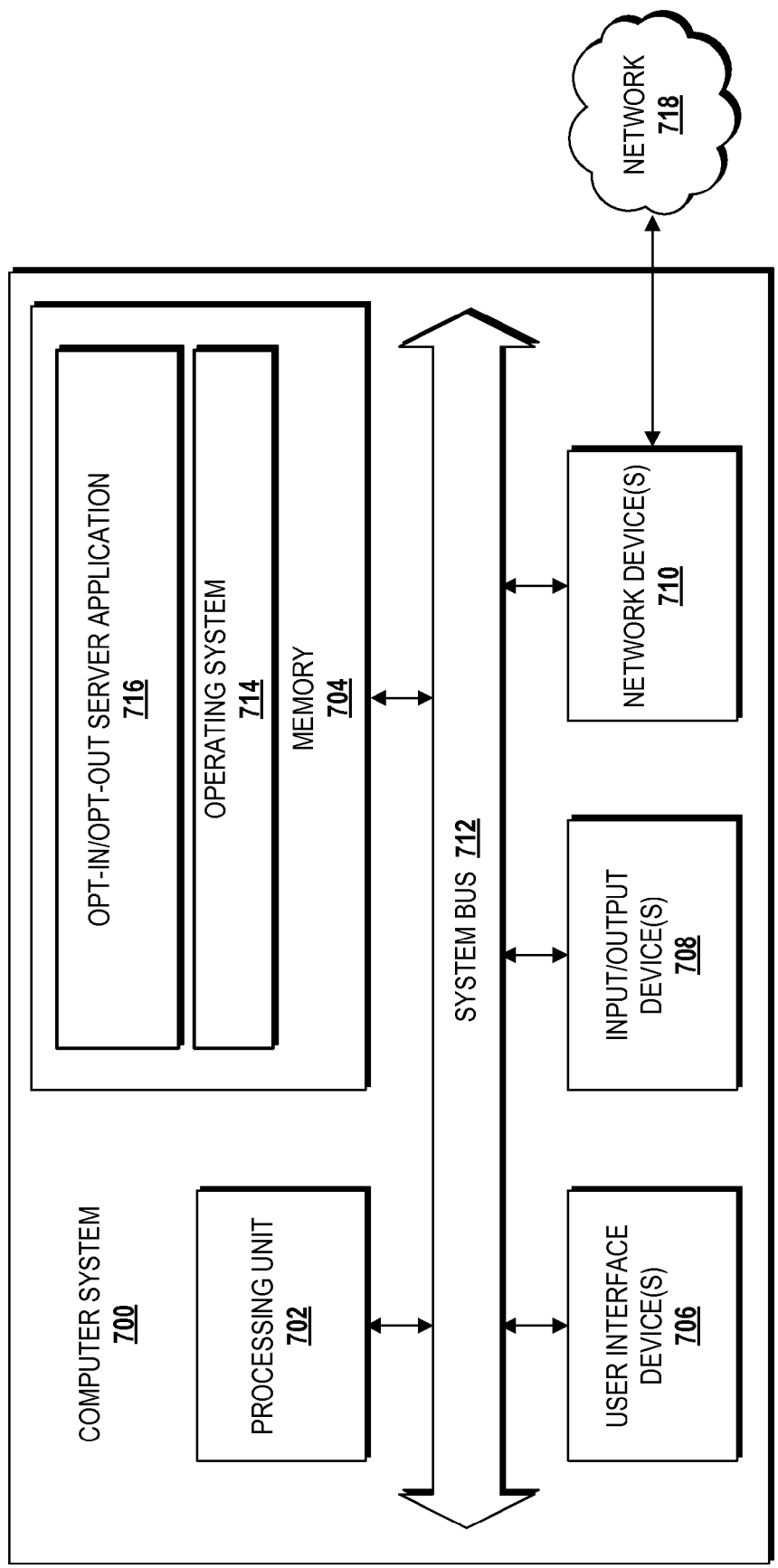
FIG. 7 is a computer architecture diagram illustrating an illustrative computer hardware and software architecture for a computing system capable of implementing aspects of the embodiments presented herein.

FIG. 7 is a block diagram illustrating a computer system 700 configured to perform various operations disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710. In some embodiments, the opt-in/opt-out server computer 128 is configured like the computer system 700. It should be understood, however, that the opt-in/opt-out server computer 700 may include additional functionality or include less functionality than now described.

The processing unit 702 may be a standard central processor that performs arithmetic and logical operations, a more specific purpose programmable logic controller ("PLC"), a programmable gate array, or other type of processor known to those skilled in the art and suitable for controlling the operation of the computer system 700. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 714 and an opt-in/opt-out server application 716.

The operating system 714 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like. The opt-in/opt-out server application 716 can include computer-executable instructions that, when executed by the processing unit 702, cause the computer system 700 to perform operations such as those described herein above with reference to the method 400 of FIG. 4.

The user interface devices 706 may include one or more devices with which a user accesses the computer system 700. The user interface devices 706 may include, but are not limited to, computers, servers, personal digital assistants, telephones (e.g., cellular, IP, or landline), or any suitable computing devices. The I/O devices 708 enable a user to interface with the program modules. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network 718, such as one or more of the networks illustrated and described with reference to FIG. 1 and/or other network(s). Examples of the network devices 710 include, but are not limited to, a modem, a radio frequency ("RF") or infrared ("IR") transceiver, a telephonic interface, a bridge, a router, or a network card. The network 718 may include a wireless network such as, but not limited to, a WLAN such as a WI-FI network, a WWAN, a wireless personal area network ("WPAN") such as BLUETOOTH, or a wireless metropolitan area network ("WMAN"). Alternatively, the network 718 may be a wired network such as, but not limited to, a wide area network ("WAN") such as the Internet, a local area network ("LAN") such as the Ethernet, a wired personal area network ("PAN"), or a wired metropolitan area network ("MAN").

The network 718 embodied as a cellular network may utilize a mobile telecommunications technology such as, but not limited to, GSM, UMTS, CDMA ONE, CDMA2000, LTE, and various other 2G, 2.5G, 3G, 4G, and greater generation mobile telecommunications technologies. In addition, mobile data communications technologies such as GPRS, EDGE, the HSPA protocol family including HSDPA, EUL or otherwise termed HSUPA, HSPA+, and various other current and future mobile data communications technologies are contemplated for use by the network 718. Therefore, the embodiments presented herein should not be construed as being limited to a particular mobile telecommunications technology and/or standards utilizing such technologies.

Figure 8:
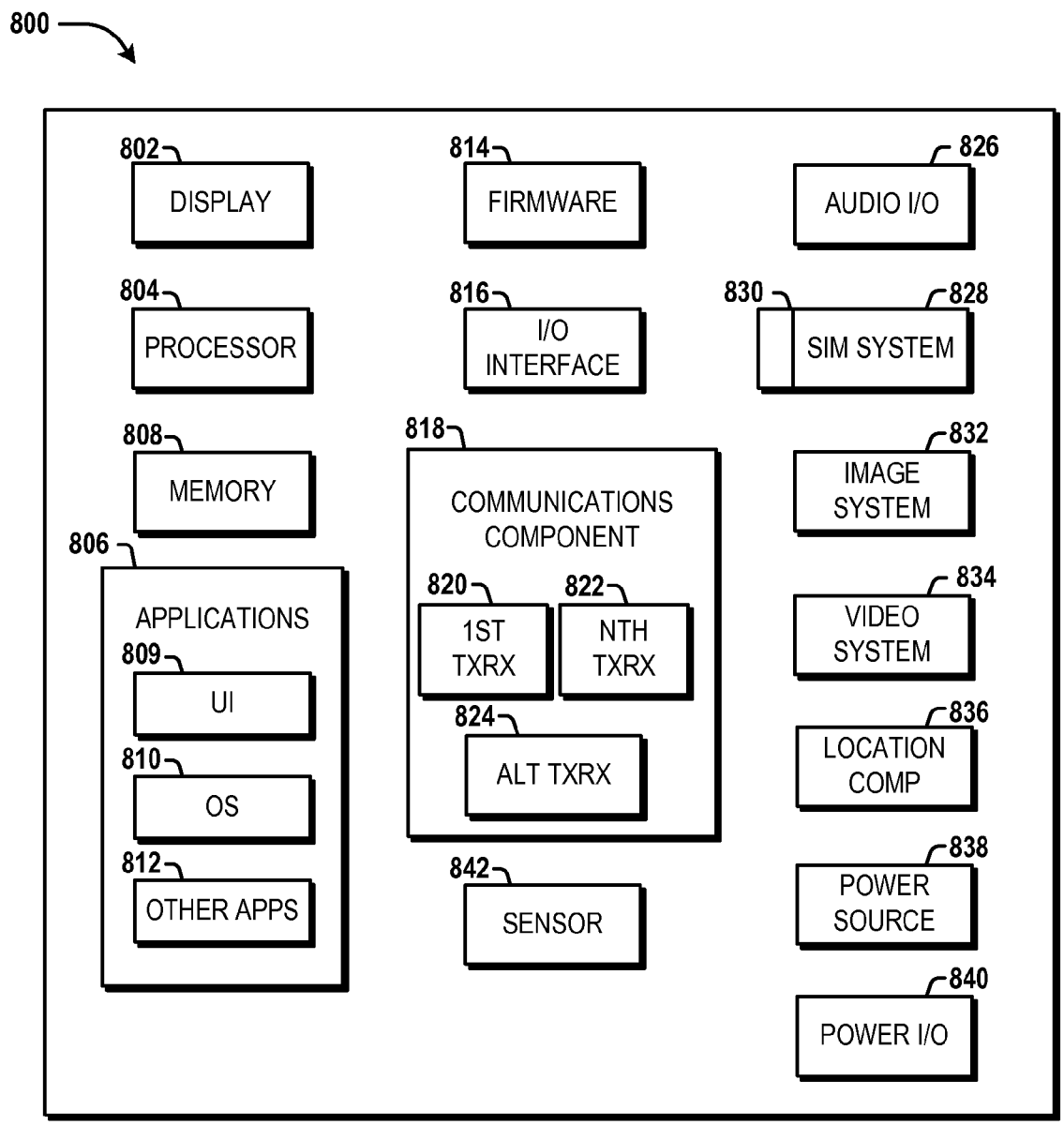
FIG. 8 is a mobile device architecture diagram illustrating an illustrative mobile device hardware and software architecture for a mobile device capable of implementing aspects of the embodiments disclosed herein.

Turning now to FIG. 8, an illustrative mobile device 800 and components thereof will be described. In some embodiments, the mobile device 102 is configured like the mobile device 800. It should be understood, however, that the mobile device 102 may include additional functionality or include less functionality than now described. Although connections are not shown between the components illustrated in FIG. 8, the components can interact with each other to carry out device functions. In some embodiments, the components are arranged so as to communicate via one or more busses (not shown). It should be understood that FIG. 8 and the following description are intended to provide a general understanding of a suitable environment in which various aspects of embodiments can be implemented.

As illustrated in FIG. 8, the mobile device 800 includes a display 802 for displaying data including, but not limited to, opt-in/opt-out settings, the rule generation interface 600, graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 800 also includes a processor 804 for processing data and/or executing computer-executable instructions of one or more applications 806, such as the application program 114, stored in a memory 808. In some embodiments, the applications 806 include a UI application 809. The UI application 809 interfaces with an operating system ("OS") application 810, such as the operating system 112, to facilitate user interaction with device functionality and data. In some embodiments, the OS application 810 is one of SYMBIAN OS from SYMBIAN LIMITED, WINDOWS MOBILE OS from MICROSOFT CORPORATION, WINDOWS PHONE OS from MICROSOFT CORPORATION, PALM WEBOS from HEWLETT PACKARD CORPORATION, BLACKBERRY OS from RESEARCH IN MOTION LIMITED, IOS from APPLE INC., and ANDROID OS from GOOGLE INC. These operating systems are merely illustrative of the operating systems that may be used in accordance with the embodiments disclosed herein.

The UI application 809 aids a user in entering message content, viewing received messages, answering/initiating calls, entering/deleting data, entering and setting user IDs and passwords for device access, configuring settings, manipulating address book content and/or settings, multimode interaction, interacting with other applications 812, and otherwise facilitating user interaction with the OS application 810, and the other applications 812.

In some embodiments, the other applications 812 include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 806 or portions thereof are stored in the memory 808 and/or in a firmware 814, and are executed by the processor 804. The firmware 814 may also store code for execution during device power up and power down operations.

The mobile device 800 also includes an input/output ("I/O") interface 816 for the input/output of data such as location information, presence status information, user IDs, passwords, and application initiation (start-up) requests. In some embodiments, the I/O interface 816 is a hardwire connection such as a universal serial bus ("USB"), mini-USB, micro-USB, audio jack, PS2, IEEE 1394, serial, parallel, Ethernet (RJ411) port, RJ11 port, proprietary port, combinations thereof, or the like. In some embodiments, the mobile device 800 is configured to synchronize with another device (e.g., a computer) to transfer content stored to/from the mobile device 800. In some embodiments, the mobile device 800 is configured to receive updates to one or more of the applications 806 via the I/O interface 816. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device instead of, or in addition to, a communications component 818.

The communications component 818 interfaces with the processor 804 to facilitate wireless communications with one or more networks such as those illustrated in FIG. 1. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers each configured to communicate over the same or a different wireless technology standard. For example, the transceivers of the communications component 818 may be configured to communicate using GSM, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like. In addition, the communications component 818 may facilitate data communications using GPRS, EDGE, the HSPA protocol family including HSDPA, EUL or otherwise termed HSUPA, HSPA+, and various other current and future wireless data access standards.

In the illustrated embodiment, the communications component 818 includes a first cellular transceiver 820 that operates in one mode (e.g., GSM), and an $N^{th}$ cellular transceiver 822 operates in a different mode (e.g., UMTS). While only two cellular transceivers 820, 822 are illustrated, it should be appreciated that more than two transceivers can be included in the communications component 818.

The illustrated communications component 818 also includes an alternative communications transceiver 824 for use by other communications technologies including WI-FI, WIMAX, BLUETOOTH, infrared, infrared data association ("IRDA"), near field communications ("NFC"), other RF, combinations thereof, and the like. In some embodiments, the communications component 818 also facilitates reception from terrestrial radio networks, digital satellite radio networks, internet-based radio service networks, combinations thereof, and the like.

The communications component 818 processes data from a network such as an internet, an intranet, a home broadband network, a WI-FI hotspot, and the like, via an internet service provider ("ISP"), digital subscriber line ("DSL") provider, or broadband provider.

Audio capabilities for the mobile device 800 may be provided by an audio I/O component 826 that includes a speaker for the output of audio signals and a microphone to collect audio signals.

The illustrated mobile device 800 also includes a USIM system 828 that includes a SIM slot interface 830 for accommodating a USIM card. In some embodiments, the USIM system 828 is configured to accept insertion of other SIM cards for access to other network types such as GSM. In other embodiments, the USIM system 828 is configured to accept multiple SIM cards. In still other embodiments, the USIM system 828 is configured to accept a universal integrated circuit card ("UICC") with one or more SIM applications stored thereupon.

The illustrated mobile device 800 also includes an image capture and processing system 832 ("image system"). Photos may be obtained via an associated image capture subsystem of the image system 832, for example, a camera. The mobile device 800 may also include a video system 834 for capturing, processing, recording, and/or modifying video content. Photos and videos obtained using the image system 832 and the video system 834, respectively, may be added as message content to an MMS message and sent to another mobile device.

The illustrated mobile device 800 also includes a location component 836 for sending and/or receiving signals such as GPS data, assisted-GPS data, WI-FI/WIMAX and/or cellular network triangulation data, combinations thereof, and the like, for determining a location of the mobile device 800. The location component 836 may communicate with the communications component 818 to retrieve triangulation data for determining a location of the mobile device 800. In some embodiments, the location component 836 interfaces with cellular network nodes, telephone lines, satellites, location transmitters and/or beacons, wireless network transmitters and receivers, combinations thereof, and the like. In some embodiments, the location component 836 includes one or more sensors such as a compass, an accelerometer, and/or a gyroscope to determine the orientation of the mobile device 800. Using the location component 836, the mobile device 800 can generate and/or receive data to identify its location, or transmit data used by other devices to determine the location of the mobile device 800. The location component 836 may include multiple components for determining the location and/or orientation of the mobile device 800.

The illustrated mobile device 800 also includes a power source 838, such as one or more batteries and/or other power subsystem (AC or DC). The power source 838 may interface with an external power system or charging equipment via a power I/O component 840.

The illustrated mobile device 800 also includes one or more sensors 842. The sensor(s) 842 can include, but are not limited to, any of the sensors described herein above. The sensor(s) 842 can be used for the application of one or more rules, such as the local rules 116 and/or the rules 134 if so configured.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 800 or other devices or computers described herein, such as the computer system described above with reference to FIG. 7. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the mobile device 800 in order to store and execute the software components presented herein. It is also contemplated that the mobile device 800 may not include all of the components shown in FIG. 8, may include other components that are not explicitly shown in FIG. 8, or may utilize an architecture completely different than that shown in FIG. 8.

Based on the foregoing, it should be appreciated that concepts and technologies for managing opt-in and opt-out for private data access have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

We claim:

1. A mobile device comprising:
a processor; and
a memory that stores instructions that, when executed by the processor, cause the processor to perform operations comprising
receiving, from an application program executed by the mobile device, a request to obtain private data associated with a user of the mobile device,
in response to the request, determining whether the application program associated with the request is permitted to access the private data based upon a rule,
when the application program is permitted to access the private data based upon the rule, instructing the application program to proceed to obtain the private data, and
when the application program is not permitted to access the private data based upon the rule, instructing the application program to avoid obtaining the private data.

2. The mobile device of claim 1, wherein determining whether the application program is permitted to access the private data based upon the rule comprises:
forwarding the request to a server computer; and
receiving a response from the server computer, the response comprising an indication of whether the application program is permitted to access the private data based upon the rule.

3. The mobile device of claim 1, wherein the instructions are included in an operating system of the mobile device.

4. The mobile device of claim 1, wherein the rule specifies one of the following:
a condition under which the user has agreed to opt-in to permitting access to the private data; and a condition under which the user has agreed to opt-out of permitting access to the private data.

5. The mobile device of claim 4, wherein:
the condition under which the user has agreed to opt-in to permitting access to the private data comprises a first location in which the user has agreed to opt-in to permitting access to the private data; and
the condition under which the user has agreed to opt-out of permitting access to the private data comprises a second location in which the user has agreed to opt-out of permitting access to the private data.

6. The mobile device of claim 4, wherein:
the condition under which the user has agreed to opt-in to permitting access to the private data comprises a first specific application program that the user has agreed to opt-in to use of to access the private data; and
the condition under which the user has agreed to opt-out of permitting access to the private data comprises a second specific application program that the user has agreed to opt-out of use of to access the private data.

7. The mobile device of claim 4, wherein:
the condition under which the user has agreed to opt-in to permitting access to the private data comprises a first time during which the user has agreed to opt-in to permitting access to the private data; and
the condition under which the user has agreed to opt-out of permitting access to the private data comprises a second time during which the user has agreed to opt-out of permitting access to the private data.

8. The mobile device of claim 4, further comprising a sensor, and wherein:
the condition under which the user has agreed to opt-in to permitting access to the private data comprises a first output threshold of the sensor within which the user has agreed to opt-in to permitting access to the private data; and
the condition under which the user has agreed to opt-out of permitting access to the private data comprises a second output threshold of the sensor within which the user has agreed to opt-out of permitting access to the private data.

9. The mobile device of claim 1, further comprising a component that obtains the private data, and wherein receiving the request to obtain the private data associated with the user of the mobile device comprises intercepting the request from the application program, the request being directed to the component.

10. The mobile device of claim 9, wherein the component comprises one of the following:
a global positioning system sensor;
a transceiver;
a second application program; and
a sensor.

11. The mobile device of claim 1, wherein receiving the request to obtain the private data associated with the user of the mobile device comprises receiving the request from the application program, the request being directed to an operating system including the instructions.

12. A computer-readable storage medium comprising computer-executable instructions that, when executed by a processor of a mobile device, cause the mobile device to perform operations comprising:
receiving, from an application program executed by the mobile device, a request to obtain private data associated with a user of the mobile device;
in response to the request, determining whether the application program associated with the request is permitted to access the private data based upon a rule;
when the application program is permitted to access the private data based upon the rule, instructing the application program to proceed to obtain the private data; and
when the application program is not permitted to access the private data based upon the rule, instructing the application program to avoid obtaining the private data.

13. The computer-readable storage medium of claim 12, wherein determining whether the application program is permitted to access the private data based upon the rule comprises:
forwarding the request to a server computer; and
receiving a response from the server computer, the response comprising an indication of whether the application program is permitted to access the private data based upon the rule.

14. The computer-readable storage medium of claim 12, wherein the rule specifies one of the following:
a condition under which the user has agreed to opt-in to permitting access to the private data; and
a condition under which the user has agreed to opt-out of permitting access to the private data.

15. The computer-readable storage medium of claim 14, wherein:
the condition under which the user has agreed to opt-in to permitting access to the private data comprises a first location in which the user has agreed to opt-in to permitting access to the private data; and
the condition under which the user has agreed to opt-out of permitting access to the private data comprises a second location in which the user has agreed to opt-out of permitting access to the private data.

16. The computer-readable storage medium of claim 14, wherein receiving the request to obtain the private data associated with the user of the mobile device comprises intercepting the request from the application program, the request being directed to a component of the mobile device, and the component comprising one of the following:
a global positioning system sensor;
a transceiver;
a second application program; and
a sensor.

17. The computer-readable storage medium of claim 14, wherein receiving the request to obtain the private data associated with the user of the mobile device comprises receiving the request from the application program, the request being directed to an operating system including the computer-executable instructions.

18. A method comprising:
receiving, by a mobile device comprising a processor from an application program executed by the mobile device, a request to obtain private data associated with a user of the mobile device;
in response to the request, determining, by the mobile device, whether the application program associated with the request is permitted to access the private data based upon a rule;
when the application program is permitted to access the private data based upon the rule, instructing, by the mobile device, the application program to proceed to obtain the private data; and
when the application program is not permitted to access the private data based upon the rule, instructing, by the mobile device, the application program to avoid obtaining the private data.

19. The mobile device of claim 18, wherein determining whether the application program is permitted to access the private data based upon the rule comprises:

forwarding the request to a server computer; and receiving a response from the server computer, the response comprising an indication of whether the application program is permitted to access the private data based upon the rule.

20. The mobile device of claim 18, wherein the rule specifies one of the following:

a condition under which the user has agreed to opt-in to permitting access to the private data; and a condition under which the user has agreed to opt-out of permitting access to the private data.

* * * * *